US012574459B2

(12) United States Patent
Cao et al.

(10) Patent No.: US 12,574,459 B2
(45) Date of Patent: Mar. 10, 2026

(54) VOICE-SYNCHRONIZED VISUAL INTERFACE

(71) Applicant: Airbnb, Inc., San Francisco, CA (US)

(72) Inventors: Yuanpei Cao, Norman, OK (US); Yaolin Chen, Beijing (CN); William B. Kamp, Jr., Milton, WA (US); Haitao Li, Sammamish, WA (US); Jonathan Li On Wing, Issaquah, WA (US); Yuqi Liu, Beijing (CN); Jiayu Lou, Redwood City, CA (US); Junyu Lu, Beijing (CN); Adrianne Martinson, Saratoga, CA (US); Chutian Wang, Mountain View, CA (US); Can Yang, Beijing (CN); Chenhao Yang, Tianjin (CN); Andrew Hideki Yasutake, Mountain View, CA (US); Fei Yuan, Beijing (CN); Yang Zhao, Beijing (CN); Yuyang Zhou, Seattle, WA (US)

(73) Assignee: Airbnb, Inc., San Francisco, CA (US)

( * ) Notice: Subject to any disclaimer, the term of this patent is extended or adjusted under 35 U.S.C. 154(b) by 275 days.

(21) Appl. No.: 18/383,604

(22) Filed: Oct. 25, 2023

(65) Prior Publication Data

US 2024/0372944 A1 Nov. 7, 2024

Related U.S. Application Data

(63) Continuation of application No. PCT/CN2023/091952, filed on May 4, 2023.

(51) Int. Cl.
*G06Q 10/02* (2012.01)
*G06F 3/16* (2006.01)
(Continued)

(52) U.S. Cl.
CPC ............ *H04M 3/493* (2013.01); *G06F 3/167* (2013.01); *G06Q 10/02* (2013.01); *G10L 15/1822* (2013.01)

(58) Field of Classification Search
None
See application file for complete search history.

(56) References Cited

U.S. PATENT DOCUMENTS 9,191,492 B1 11/2015 Miller et al.
2009/0149158 A1* 6/2009 Goldfarb ................ H04L 67/02
455/414.1

(Continued)

FOREIGN PATENT DOCUMENTS

WO WO-2014071391 A1 5/2014

OTHER PUBLICATIONS

"International Application Serial No. PCT/CN2023/091952, International Search Report mailed Jun. 21, 2023", 3 pgs.

(Continued)

*Primary Examiner* — Nafiz E Hoque
(74) *Attorney, Agent, or Firm* — Schwegman Lundberg & Woessner, P.A.

(57) ABSTRACT

A system that enables synchronized interaction between voice input and a visual user interface is described. The system receives, by a network site via a first user interaction channel, a user request to perform an action with a listing network platform. The system establishes, by the network site, a session associated with a session identifier for the user request and provides an option for the user to continue interacting with the listing network platform through a second user interaction channel. The system, in response to receiving input that selects the option, uses the session identifier associated with the session to synchronize a first set of inputs received through the first user interaction
(Continued)

channel with a second set of inputs received through the second user interaction channel to complete the action on the listing network platform.

20 Claims, 11 Drawing Sheets

(51) Int. Cl.
  *G10L 15/18*    (2013.01)
  *H04M 3/493*   (2006.01)

(56)        References Cited

U.S. PATENT DOCUMENTS

2013/0331070 A1*   12/2013   Aldecoa ................. H04W 4/02
                      455/414.1
2019/0146807 A1    5/2019   Degangi et al.

OTHER PUBLICATIONS

"International Application Serial No. PCT/CN2023/091952, Written Opinion mailed Jun. 21, 2023", 3 pgs.

* cited by examiner

FIRST USER INTERACTION CHANNEL

SECOND USER INTERACTION CHANNEL

800

801

820

810

17:55

10:00

WE HOPE YOU ENJOY YOUR STAY AT THE JORDAN VALLEY

YOU'RE ALL SET FOR JORDAN VALLEY

CHECK-IN
TUE, DEC 20
9:00 PM

CHECKOUT
WED, DEC 21
11:00 AM

GETTING THERE

THINGS TO KNOW

MESSAGE YOUR HOST

YOUR PLACE

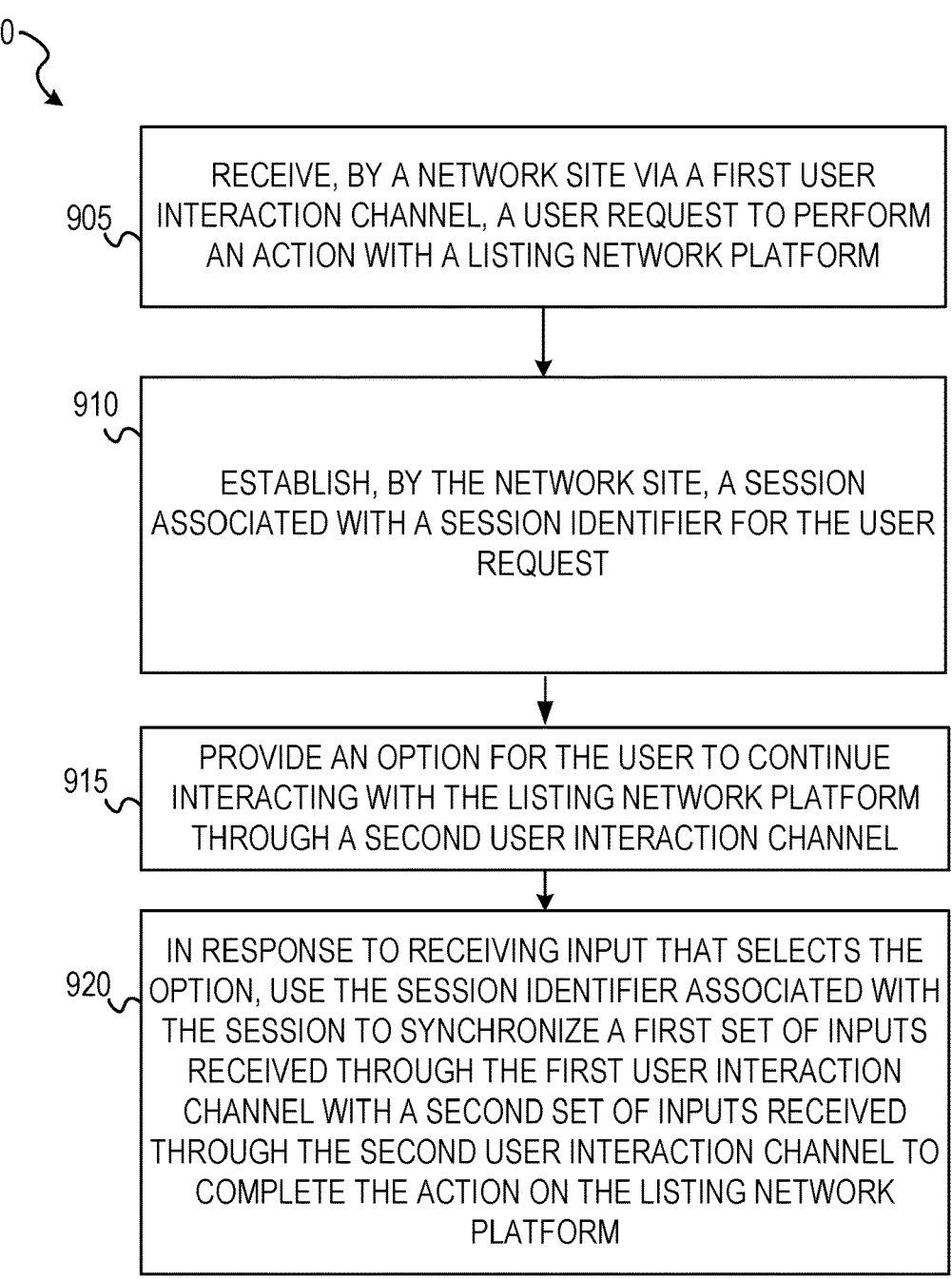

900

905     RECEIVE, BY A NETWORK SITE VIA A FIRST USER INTERACTION CHANNEL, A USER REQUEST TO PERFORM AN ACTION WITH A LISTING NETWORK PLATFORM

910     ESTABLISH, BY THE NETWORK SITE, A SESSION ASSOCIATED WITH A SESSION IDENTIFIER FOR THE USER REQUEST

915     PROVIDE AN OPTION FOR THE USER TO CONTINUE INTERACTING WITH THE LISTING NETWORK PLATFORM THROUGH A SECOND USER INTERACTION CHANNEL

920     IN RESPONSE TO RECEIVING INPUT THAT SELECTS THE OPTION, USE THE SESSION IDENTIFIER ASSOCIATED WITH THE SESSION TO SYNCHRONIZE A FIRST SET OF INPUTS RECEIVED THROUGH THE FIRST USER INTERACTION CHANNEL WITH A SECOND SET OF INPUTS RECEIVED THROUGH THE SECOND USER INTERACTION CHANNEL TO COMPLETE THE ACTION ON THE LISTING NETWORK PLATFORM

FIG. 9

VOICE-SYNCHRONIZED VISUAL INTERFACE

PRIORITY

This application claims the benefit of priority from International Application No. PCT/CN2023/091952, filed May 4, 2023, which is incorporated by reference herein in its entirety.

TECHNICAL FIELD

The present disclosure generally relates to special-purpose machines that manage data processing and improvements to such variants, and to the technologies by which such special-purpose machines become improved compared to other special-purpose machines for generating voice synchronized visual interfaces.

BACKGROUND

Network site users can create content for viewing and interaction by other network site users (e.g., booking, registering, subscribing, viewing of listings). The posted content can be updated, created, or deleted, and it can be computationally challenging for a network site to return valid search results to network site users searching for content (e.g., listings for reservations) with specified parameters (e.g., dates, categories, prices, quantity). For example, if there are a large number of users posting and updating content and also a large number of users submitting complex searches for the posted content, any delay in computation due to query complexity may cause inaccurate results to be returned and cause large computational resource consumption (e.g., processing, memory, network overhead).

BRIEF DESCRIPTION OF THE DRAWINGS

Various ones of the appended drawings merely illustrate example embodiments of the present disclosure and should not be considered as limiting its scope.

FIG. 9 shows a flow diagram of various processes and methods for synchronizing user interactions with the listing network site across various user interaction channels, according to some example embodiments.

DETAILED DESCRIPTION

Figure 1:
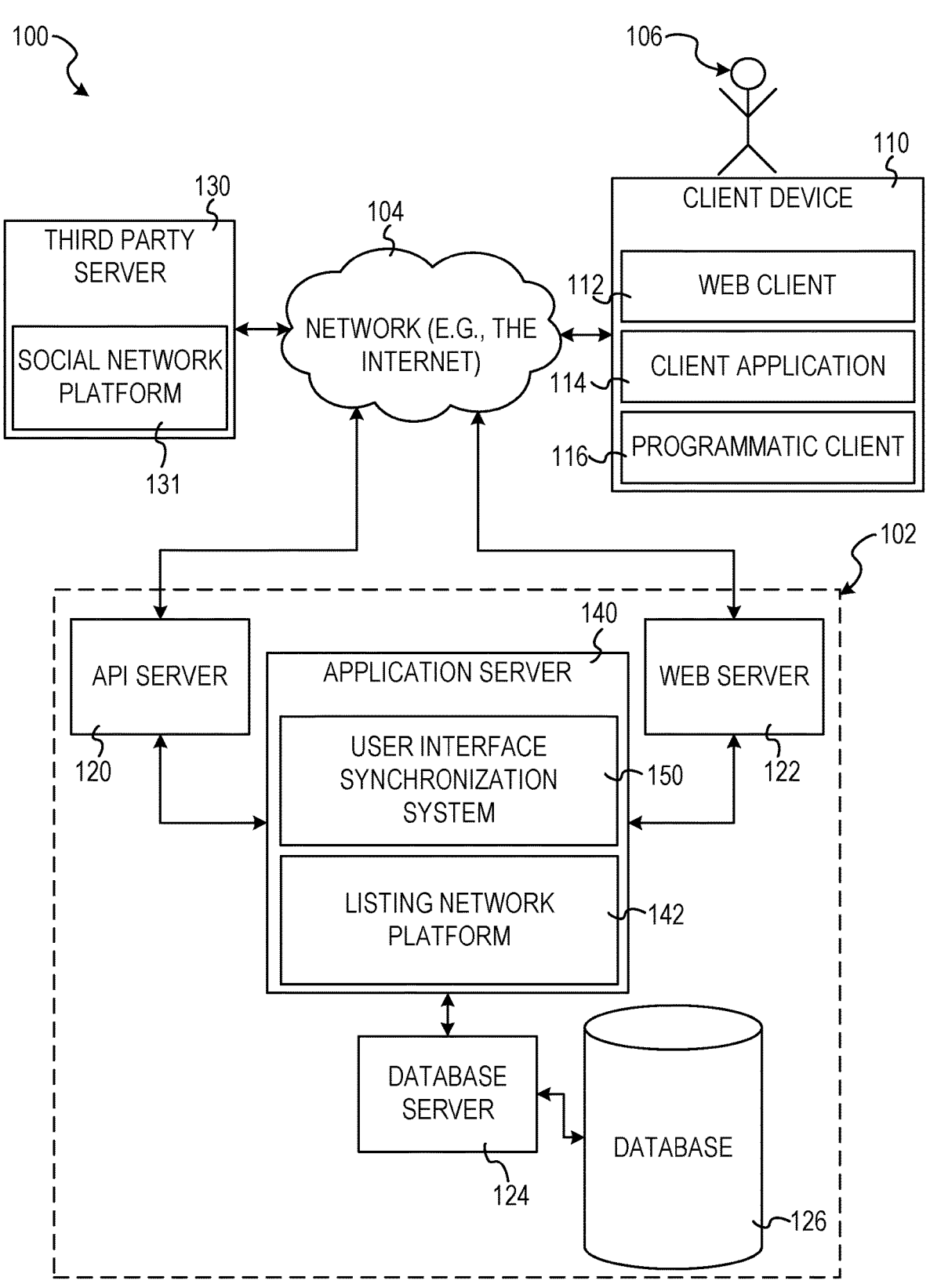
FIG. 1 is a block diagram illustrating a user interface synchronization system implemented in a networked environment, according to some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed above, it can be difficult to return up-to-date results for complex queries for content posted on a network site. In addition, navigating the vast array of content available on the network site can be very complex and time consuming. Such navigation can entail browsing multiple pages of information to find a suitable result or action. To this end, a user interface synchronization system can be configured to efficiently search for complex queries, allow browsing of a network site, and return accurate results and perform requested actions with low computational resource usage. Although in the following discussion the example posted content are accommodations listings (e.g., listings for reservations) posted on a network site for searching and interacting with other end users, other types of network site content posted by end users and searched for by other end users can likewise be implemented in the user interface synchronization system processes and methods, such as transportation, experiences, and/or events.

Generally, a listing platform can be searched for result listings that are available for a specified date range, price range, and/or other attributes (amenities, cancelation policy, etc.), which can be specified in a given query (e.g., text field, drop-down menu, checkbox filters). To search and browse the listing platform, users can access the listing platform on a particular user interface channel, such as by phone or through an application associated with the listing platform. Although various channels are available for a user to search and browse listings, the interactions performed through these various channels are not synchronized. This results in a disruptive user experience where actions performed with the same listing service system on one user interface channel are not reflected on another user interface channel.

While some of the listing attributes are relatively static and common across the potential results and therefore fast to look up, pricing and date availability are highly dynamic because (1) pricing and date availability change frequently (e.g., the host of a listing updates an availability calendar, dynamic pricing changes due to demand and supply), and (2) the price and date availability attributes have a higher accuracy burden (e.g., searching end users have a low tolerance for pricing discrepancies). To address these issues, price and date availability attributes are handled at search time in response to handling each new query received through a particular user interface channel. This can consume a significant amount of computational resources. For example, the process of computing pricing and availability per listing can consume over 30% of search-serving CPU processing for regular queries (e.g., simple date range, finite price range, small geographic area). Due to the speed and frequency at which the pricing and data availability change, it becomes impracticable for a user to perform the search through one user interface channel and then navigate through various pages of information to complete a request through another user interface channel given the lack of real time synchronization between these different channels. These inefficiencies can drastically increase by orders of magnitude for complex queries, such as a listings query with multiple possible date ranges, which may be a simple demand for an end user (e.g., users may not know at search time when they have availability or time off for travel).

Sometimes, these systems can use up the computational resources to find matching listings and may end up failing to identify a sufficient number of candidate matches. The results presented to the user can therefore be minimal, which may cause the user to manually adjust search parameters in an attempt to find better matches. Sometimes the revision of the parameters or improvement of the search can be better handled through a different user interface channel. But updating the other user interface channel to reflect the current state of a previous user interface channel is very tedious and time consuming. Once the search parameters are ultimately updated, the revision of the search parameters causes the systems to again consume a great deal of computational resources to find match results. In many cases, users may still be unsatisfied with the matches that are returned and may decide to manually shorten or extend the duration of stay. Such repetitive and manual processes are incredibly time consuming and can be very frustrating to end users. This can result in missed opportunities and wasted computational resources.

To address these technical problems, the disclosed techniques provide a network site that allows a user to interact with the listing network site through multiple user interface channels in a synchronized manner in real time. Namely, the network site can establish a session for the user with a first user interface channel (e.g., an interactive voice response system or phone-based system) and can receive inputs through the first user interface channel. The network site can then use a session identifier of the session to trigger presentation of content on a second user interface channel (e.g., a graphical user interface on a client device, such as an application associated with the network site) in a synchronized manner and together with presenting and/or receiving inputs through the first user interface channel. In this way, any interaction or input received by the network site from the first user interface channel is instantly reflected and triggers a response or output of the second user interface channel, or vice versa. This allows the user to provide inputs in the most convenient manner to the network site to browse listings, perform actions, and make selections in real time through multiple user interface channels. This, in effect, reduces the amount of computational resources needed to be dedicated and consumed by a given searching end-user on one particular user interface channel, which frees up such resources for other tasks and satisfying other search requests.

With reference to FIG. 1, an example embodiment of a high-level client-server-based network architecture 100 is shown. A networked system 102, in the example form of a network-based listing services system, provides server-side functionality via a network 104 (e.g., the Internet or wide area network (WAN)) to one or more client devices 110. In some implementations, a user (e.g., user 106) interacts with the networked system 102 using the client device 110.

FIG. 1 illustrates, for example, a web client 112 (e.g., a browser), a client application(s) 114, and a programmatic client 116 executing on the client device 110. The client device 110 includes the web client 112, the client application(s) 114, and/or the programmatic client 116 alone, together, or in any suitable combination. Although FIG. 1 shows one client device 110, in other implementations, the network architecture 100 comprises multiple client devices.

In various implementations, the client device 110 can include a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box (STB), network personal computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 can implement a first user interaction channel (e.g., an interaction voice response (IVR) system or telephone communication channel) and also a second user interaction channel (e.g., a graphical user interface (GUI) of a client application 114 that communicates over a network, such as the Internet with a remote server. While the disclosed techniques generally refer to telephone or voice-only based communication channels as the "first user interaction channel" and a client application 114 GUI-based communications through a network as the "second user interaction channel," in some cases the second user interaction channel can perform the functions and take the place of the first user interaction channel and the first user interaction channel can perform the functions and take the place of the second user interaction channel.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof. In communicating with the network 104 through the first user interaction channel, the client device 110 may only send audio or voice data to the network 104. In communicating with the network 104 through the second user interaction channel, the client device 110 may send data representing selections on a GUI, image content, and/or audio or voice data to the network 104.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, e-commerce site apps (also referred to as "marketplace apps"), and reservation applications for temporary stays or experiences at hotels, motels, or residences managed by other end users (e.g., a posting end user who owns a home and rents out the entire home or private room). In some implementations, the client application(s) 114 include various components operable to present information to the user and communicate with the networked system 102. In some embodiments, if the e-commerce site application is included in the client device 110, then this application is configured to locally provide the user interface and at least some of the functionalities with the application configured to communicate with the networked system 102, on an as-needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120.

Users (e.g., the user 106) can include a person, a machine, or other means of interacting with the client device 110. In some examples, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104 by way of the second user interaction channel. In this instance, the networked system 102, in response to receiving the input from the user 106, communicates information to the client device 110 via the network 104 to be presented to the user 106. In this way, the user 106 can interact with the networked system 102 using the client device 110. As another example, the user 106 provides input (e.g., speech input) to the client device 110 and the input is communicated to the networked system 102 via the network 104 in the form of audio packets or audio data by way of the first user interaction channel.

The API server 120 and the web server 122 are coupled to, and provide programmatic and web interfaces respectively to, one or more application server(s) 140. The application server(s) 140 may host a listing network platform 142 and a user interface synchronization system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., inventory, image data, catalog data) to the listing network platform 142. The database(s) 126 also stores digital goods information in accordance with some examples.

The listing network platform 142 provides a number of publication functions and listing services to the users who access the networked system 102. While the listing network platform 142 is shown in FIG. 1 to form part of the networked system 102, it will be appreciated that, in alternative embodiments, the listing network platform 142 may form part of a web service that is separate and distinct from the networked system 102. In some implementations, the user interface synchronization system 150 provides functionality to synchronize data (e.g., a first set of user inputs) received from the first user interaction channel with data (e.g., a second set of user inputs) received from the second user interaction channel in real time, as discussed in further detail below.

While the client-server-based network architecture 100 shown in FIG. 1 employs a client-server architecture, the disclosed techniques are not limited to such an architecture, and can equally be implemented in a distributed, or peer-to-peer, architecture system, for example. The various systems of the applications server(s) 140 (e.g., the listing network platform 142 and user interface synchronization system 150) may also be implemented as standalone software programs, which do not necessarily have networking capabilities.

The listing network platform 142 can be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components access one or more database(s) 126 via the database server(s) 124. The listing network platform 142 provides a number of publishing and listing mechanisms whereby a seller (also referred to as a "first user," posting user, host) may list (or publish information concerning) goods or services for sale or barter, a buyer (also referred to as a "second user," searching user, guest) can express interest in or indicate a desire to purchase or barter such goods or services, and a transaction (such as a trade) may be completed pertaining to the goods or services.

Figure 2:
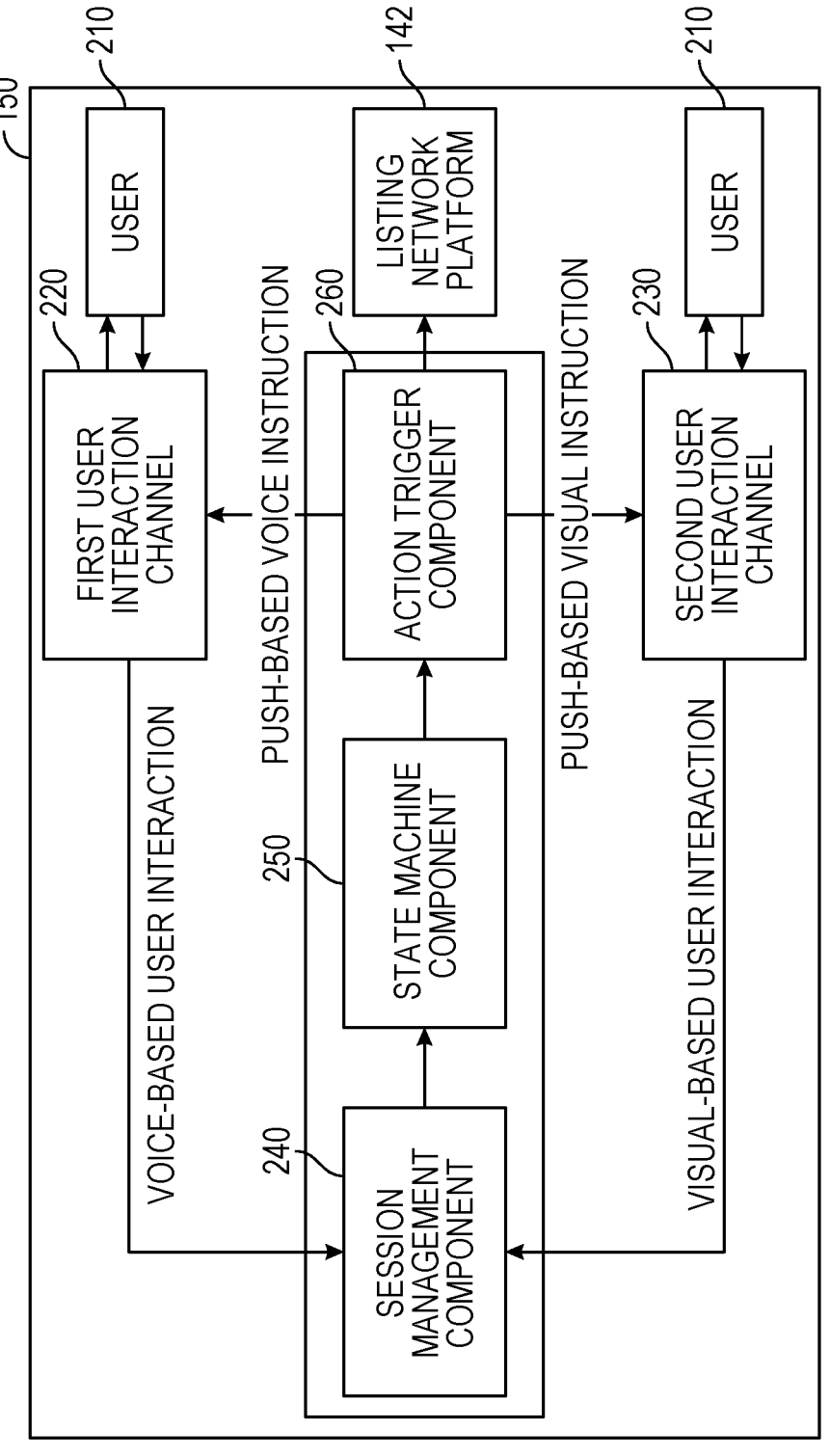
FIG. 2 shows an example of functional engines of a user interface synchronization system, according to some examples.

FIG. 2 shows example functional engines of the user interface synchronization system 150, according to some examples. As illustrated, the user interface synchronization system 150 includes a session management component 240, a state machine component 250, an action trigger component 260, a first user interaction channel 220 (also referred to as a first user interface channel), and a second user interaction channel 230 (also referred to as a second user interface channel). In some examples, a user may desire to perform some action with the listing network platform 142. For example, the user may desire to search for a listing for a reservation, modify one or more reservations held by the listing network platform 142, list a reservation on the listing network platform 142, communicate with a host of a listing on the listing network platform 142, request a refund for a reservation on the listing network platform 142, pay for services on the listing network platform 142, and/or to perform any other available function on the listing network platform 142.

In such cases, the user 210 may initiate contact with the listing network platform 142 through any number of user interaction channels, such as the first user interaction channel 220 and/or the second user interaction channel 230. For example, the user 210 can establish the first user interaction channel 220 with the listing network platform 142 by placing a telephone call using the client device 110 to a service phone number associated with the listing network platform 142. In response to receiving the telephone call, the listing network platform 142 can search a database that associates a telephone number of the client device 110 with an account of the user 210 on the listing network platform 142. Specifically, the listing network platform 142 can receive the phone call and route the phone number of the client device 110 to the session management component 240. The session management component 240 can search the database to locate an account associated with the phone number on the listing network platform 142.

Once the session management component 240 locates the account, the session management component 240 can generate a unique session identifier for the current phone call and store the session identifier in association with the identified account. Then, the session management component 240 can generate an audible prompt for presentation on the client device 110 via the first user interaction channel 220. The audible prompt can ask the user 210 to confirm or verify the user's identity. The session management component 240 can search for any current reservations, upcoming reservations, and/or canceled reservations that are associated with the account. The session management component 240 can select a reservation associated with the most recent activity on the listing network platform 142 and can audibly ask the user 210 if the selected reservation is the reason for the phone call. The audible prompt can also inform the user 210 to speak freely about what actions the user 210 would like to perform on the listing network platform 142.

The session management component 240 can receive verbal or audible input from the user 210 via the first user interaction channel 220 in response to presenting the audible prompt to the user 210. The session management component 240 can convert the verbal input to text and then apply one or more previously trained language machine learning models to decode the text into one or more commands. In some cases, the session management component 240 can, while monitoring the first user interaction channel 220 for the verbal input or audible input (e.g., representing key presses on a digital keypad of the client device 110), monitor for inputs received through the second user interaction channel 230.

In some cases, the session management component 240 can determine whether the client device 110 of the user 210 and/or a different client device is currently accessing the same account that has been identified. For example, the session management component 240 can determine whether data is currently being received through the second user interaction channel 230 from the same or different client device 110. If data is currently being received through the second user interaction channel 230, the session management component 240 can determine that the user 210 is also currently accessing the listing network platform 142 through a visual user interface.

In response to determining that the same account is currently being accessed on the client device 110 through the visual user interface, the session management component 240 can associate the same session identifier that was established in response to receiving the telephone call with the session of the visual interface. Namely, the session management component 240 associates the same session identifier with audio data received through the first user interaction channel 220 and other data received through the second user interaction channel 230. In some cases, the session management component 240 determines that the visual interface is not currently being used to access the account for the user 210 on the listing network platform 142. In such cases, the session management component 240 instructs the client device 110 of the user 210 to generate a notification (e.g., visual notification) or prompt with an option to enable synchronization of inputs received through the first user interaction channel 220 and the second user interaction channel 230. For example, the session management component 240 can transmit a message through the second user interaction channel 230 to the programmatic client 116 implemented on the client device 110 with instructions for the programmatic client 116 to present a notification that identifies the current telephone call that is active on the first user interaction channel 220 and that includes an interactive option to enable synchronization between interactions performed on the programmatic client

116 with interactions performed or spoken through the first user interaction channel 220 on the telephone call.

The programmatic client 116 can receive input that selects the interactive option. In response, the programmatic client 116 transmits a confirmation command through the second user interaction channel 230 back to the session management component 240. The session management component 240 then associates the previously established session identifier for the user 210 on the first user interaction channel 220 with the programmatic client 116 and data received through the second user interaction channel 230.

In some examples, the session is initially started with the programmatic client 116 and the option to synchronize is presented through the first user interaction channel 220. For example, the session management component 240 can determine that data is being received through the second user interaction channel 230 from the programmatic client 116. The session management component 240 can identify the account associated with the user 210 based on the received data. In response to identifying the account, the session management component 240 can establish a session identifier for the current session that has been initiated based on the data received from the second user interaction channel 230. The session management component 240 can present an option in the GUI of the programmatic client 116 to synchronize inputs received from the second user interaction channel 230 with inputs received through the first user interaction channel 220.

In response to receiving input that selects the option on the GUI, the programmatic client 116 transmits data via the second user interaction channel 230 to the session management component 240 indicating that the user selected the option on the GUI to synchronize the inputs. In this case, the session management component 240 can initiate a phone call to a phone number associated with the account. Once the client device 110 associated with the phone number answers the call, the audio data received through the first user interaction channel 220 is associated with the previously established session identifier for the account. Now, the session management component 240 continuously monitors input received through the first user interaction channel 220 by way of the phone call concurrently with inputs received via the GUI through the second user interaction channel 230.

In some examples, the session management component 240 receives data indicating a first input through the first user interaction channel 220. In response, the session management component 240 decodes the data and provides the decoded data representing the first input to the state machine component 250. The state machine component 250 implements a state machine for managing a session associated with the user 210. The state machine component 250, in response to receiving the data from the session management component 240, advances or transitions the state of the state machine to a second state based on the data and the conditions associated with a first current state. The state machine component 250 provides information associated with the second state to the action trigger component 260. The action trigger component 260 selects a particular action to perform that is associated with the second state. In some cases, the action trigger component 260 generates an output corresponding to the second state. The output is communicated back to the user 210 through the first user interaction channel 220 and/or through the second user interaction channel 230.

Figure 3:
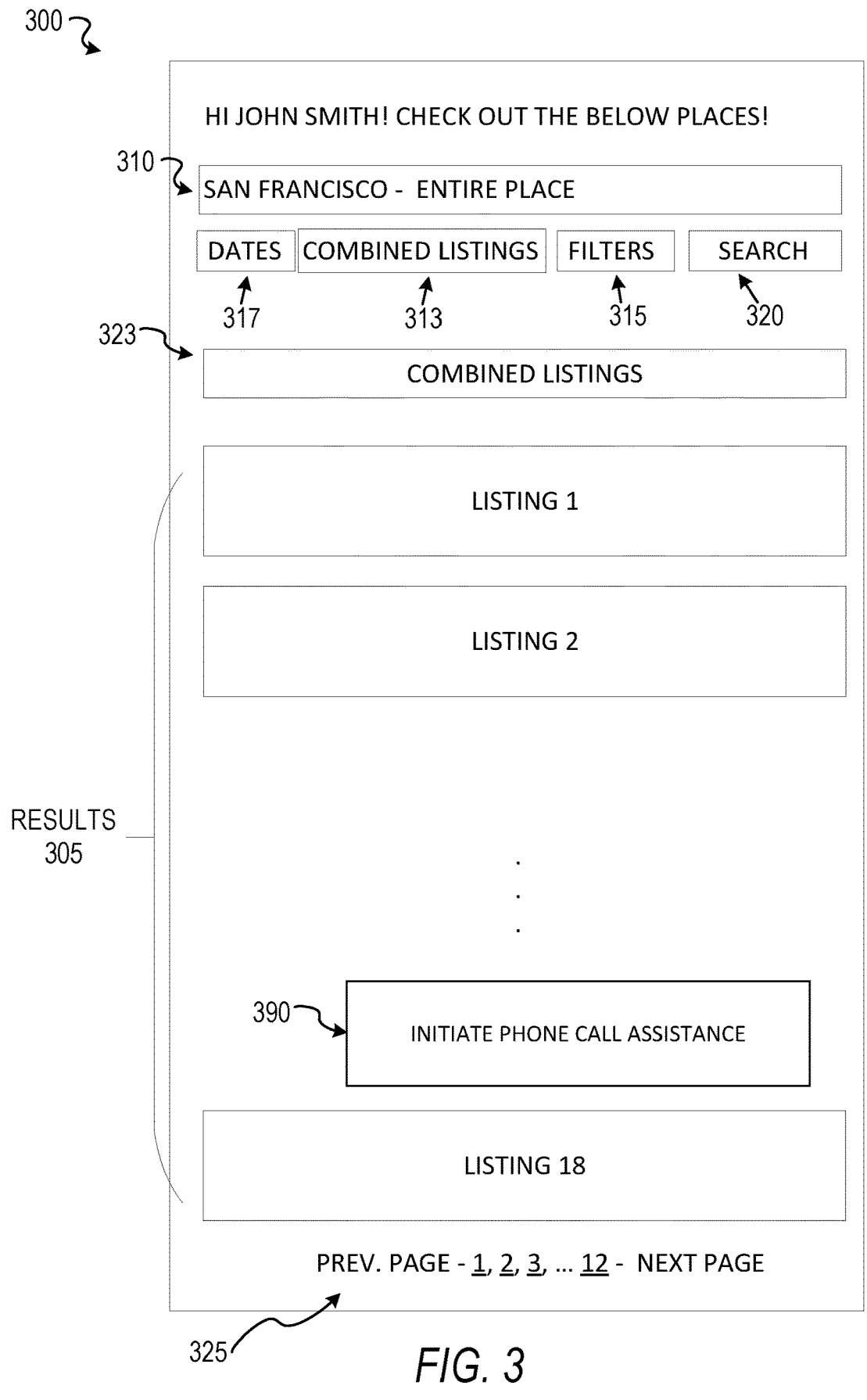
FIG. 3 shows a listings network site user interface generated by the listing network platform and user interface synchronization system, according to some examples.

FIG. 3 shows a listings network site user interface 300 (e.g., mobile application user interface, web browser user interface) generated by the listing network platform 142 and user interface synchronization system 150, according to some examples. The user interface 300 can be presented by the programmatic client 116 implemented on the client device 110. As illustrated, the user interface 300 includes a search field 310, a filters menu element 315 (e.g., place type, amenities), and a search button 320. The user enters a listings query into the search field 310, such as a search for temporary housing in San Francisco, and a category limitation from the filters menu element 315 of "Entire Place" (e.g., the user seeks to rent the entire residence for said dates, as opposed to renting a private room in another person's residence). The user can customize the query directly using terms input into the search field 310 or filters listed via selection of the filters menu element 315. Further, the user can select dates using the dates drop-down element 317 to select a specific date range for the temporary stay. For example, the user can select the dates drop-down element 317 and a pop-up calendar (not depicted in FIG. 3) to specify the stay in San Francisco is to be specifically from Jul. 16, 2021 to Jul. 18, 2021.

Upon submitting the query (e.g., via selection of the search button 320, or automatically upon selecting the combined listings element 313 (split stays option) or dates drop-down element 317, a communication is sent from the programmatic client 116 to the session management component 240 via the second user interaction channel 230. The user interface synchronization system 150 generates an output that includes a results display of the listings matching the query and transmits the output via the second user interaction channel 230 to the programmatic client 116.

The results are then displayed in the listings results area 305. The user can then select the listings or navigate to additional pages via page navigational elements 325. In some examples, the user interface 300 includes a set of combined listings 323 together with individual listings displayed in the results area 305. The combined listings 323 can be positioned within the display in a dedicated area, on top of the individual listings, between two individual listings, and/or underneath the individual listings. In some examples, the combined listings 323 are provided in response to receiving input that selects the combined listings element 313. In some examples, the combined listings 323 are presented automatically without receiving input that selects the combined listings element 313.

In some examples, the combined listings 323 are displayed in different slots or portions of the display relative to other individual listings on the basis of the type of client device being used to access the system. For example, on a mobile device, the combined listings 323 can be placed in slots 3, 6, 9, and 12 on the first page, and on a desktop computer, the same combined listings 323 may be presented in slots 5, 9, 14 and 20 for better visual balance. As referred to herein, the term "slots" means an area of a display in which a category is presented. In some cases, the combined listings 323 are excluded from being presented for last minute stays, such as if the travel dates are within 48 hours of check in or starting the trip. In some examples, the combined listings 323 include individual listings of destinations or stays that are at least two hours driving distance apart but no more than 10 hours driving distance apart. In some examples, the combined listings 323 excludes repeating pairs of the same individual listings. In some examples, the combined listings 323 relate to pairs of individual listings from different neighborhoods and locations. In such cases, neighborhoods and listings can be repeated across pairs of combined listings 323.

Using a specific example, a listing request can be received for a one-month stay in Kauai specifying beachfront homes. In this example, the user 210 identifies only three individual listings that meet these search parameters but identifies ten additional stays as combined listings 323. The combined listings 323 can represent opportunities to experience different sides of the island throughout the trip and can include an option to split time between two cities (e.g., Koloa and Hanalei), split time between two other cities (e.g., Koloa and Lihue), split time between two listings that are 1 mile apart in Koloa, split time in related cites (e.g., Poipu and Princeville) and/or related cities (e.g., Lihue and Princeville), and so forth. The result of selecting the combined listings element 313 or the user 210 automatically identifying combined listings without having a combined listings element 313 can provide 40% more unique inventory for the user to select that would be excluded if only individual listings were presented.

In some examples, the combined listings 323 presentation can vary based on the type of category selected. For example, if a national parks category is selected, the combined listings 323 can include two different national park points of interest that are at least two hours' drive apart and a maximum of 10 hours' drive apart. In some cases, if the national parks are very remote, they can still be paired even if their distances exceed these thresholds. The combined listings 323 graphical representation can visually identify the two national park listings that form part of the same combined listing without specifying the region/city name. As another example, if a surfing category is selected, two different surfing destinations can be selected that are two hours' drive apart and a maximum of 10 hours' drive apart. The combined listings 323 graphical representation can visually identify the two surfing destinations that form part of the same combined listing using the region/city name.

In some examples, the combined listings 323 are conditionally presented on the basis of the length of time of the travel dates specified by the user. For example, the user 210 can determine that the length of stay of a listing request is between 14 nights and 120 nights. In such cases, the user 210 automatically generates combined listings 323 for presentation to the user along with individual listings. In some cases, if the duration is between 60 and 120 nights, each individual listing included in the combined listings 323 can be limited to having a maximum availability of 60 nights. Namely, the combined listings 323 includes individual listings that are exactly 60 nights each.

Figure 4:
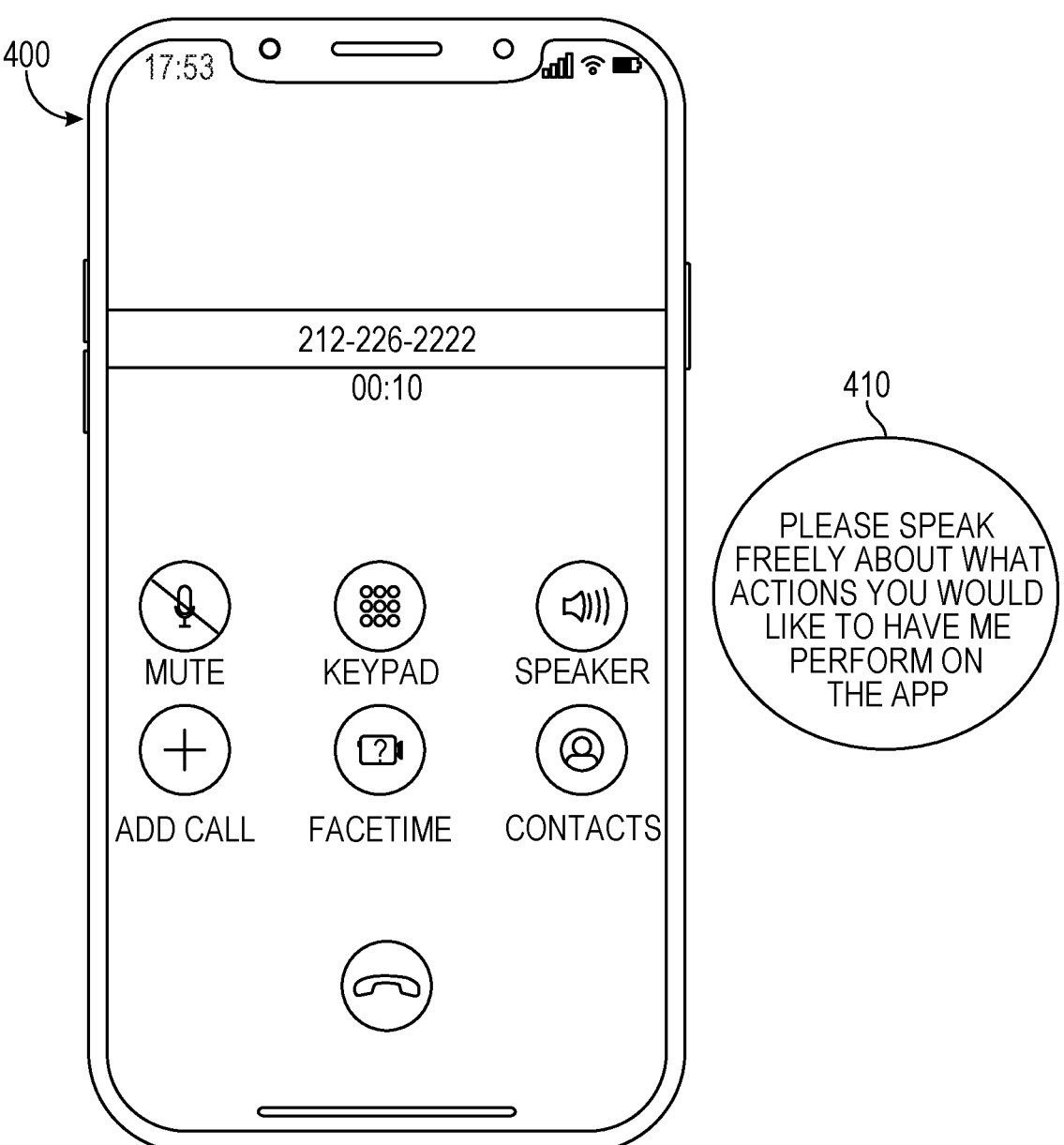
FIGS. 4-8 show example configurations of a synchronized user interaction channels listing system, according to some examples.

The user interface 300 includes an option 390 to initiate phone call assistance. In response to receiving selection of the option 390, the programmatic client 116 transmits data to the user interface synchronization system 150 requesting that inputs transmitted through the second user interaction channel 230 be synchronized with inputs transmitted through the first user interaction channel 220. The user interface synchronization system 150, in response to receiving the indication that the option 390 was selected, identifies a phone number associated with the account for which the user interface 300 is presented. The user interface synchronization system 150 initiates or places a phone call to the phone number associated with the account. For example, as shown in the diagram 400 of FIG. 4, a client device 110 can receive the phone call from the user interface synchronization system 150. The client device 110 can receive audio through the phone call that speaks a prompt 410. The prompt 410 can instruct or inform the user to speak freely about what actions the user would like to have performed by the user interface synchronization system 150 and represented or synchronized with the user interface 300.

In some examples, the user can speak on the phone and provide verbal input that indicates "select the first listing that is being displayed." The user interface synchronization system 150 can receive the verbal input through the first user interaction channel 220. The session management component 240 can decode the verbal input and can access the state machine component 250 to determine what content is currently being presented on the user interface 300. The session management component 240 together with the state machine component 250 can interpret the pronoun or ambiguous verbal input "first listing" that was received through the first user interaction channel 220 based on the data received through the second user interaction channel 230 indicating what listings are presented currently in the results area 305. The state machine component 250 can obtain an identifier of the listing that is at a top of the results area 305 and interpret the pronoun or ambiguous verbal input as referring to the listing that is at the top of the results area 305. The state machine component 250 can then navigate a cursor automatically to highlight the listing at the top of the results area 305 in response to the verbal input received through the first user interaction channel 220.

In some cases, the state machine component 250 can generate an audible response on the first user interaction channel 220 asking the user: "is the highlighted listing the one you mean?" If the user confirms the selection by speaking a confirmation like "yes," which is sent via the first user interaction channel 220, the user interface synchronization system 150 instructs the user interface 300 via the second user interaction channel 230 to navigate to a second user interface display that corresponds to the highlighted listing. The user 210 can then continue performing additional actions for the reservation associated with the highlighted listing through the second user interface and/or in combination with speaking verbal commands that are provided to the user interface synchronization system 150 via the first user interaction channel 220. This synchronization between inputs that can be received through either or both of the first user interaction channel 220 and/or the second user interaction channel 230 simplifies the user experience with the listing network platform 142 and allows the user to complete tasks and actions much faster and with less time while consuming fewer system resources.

Figure 5:
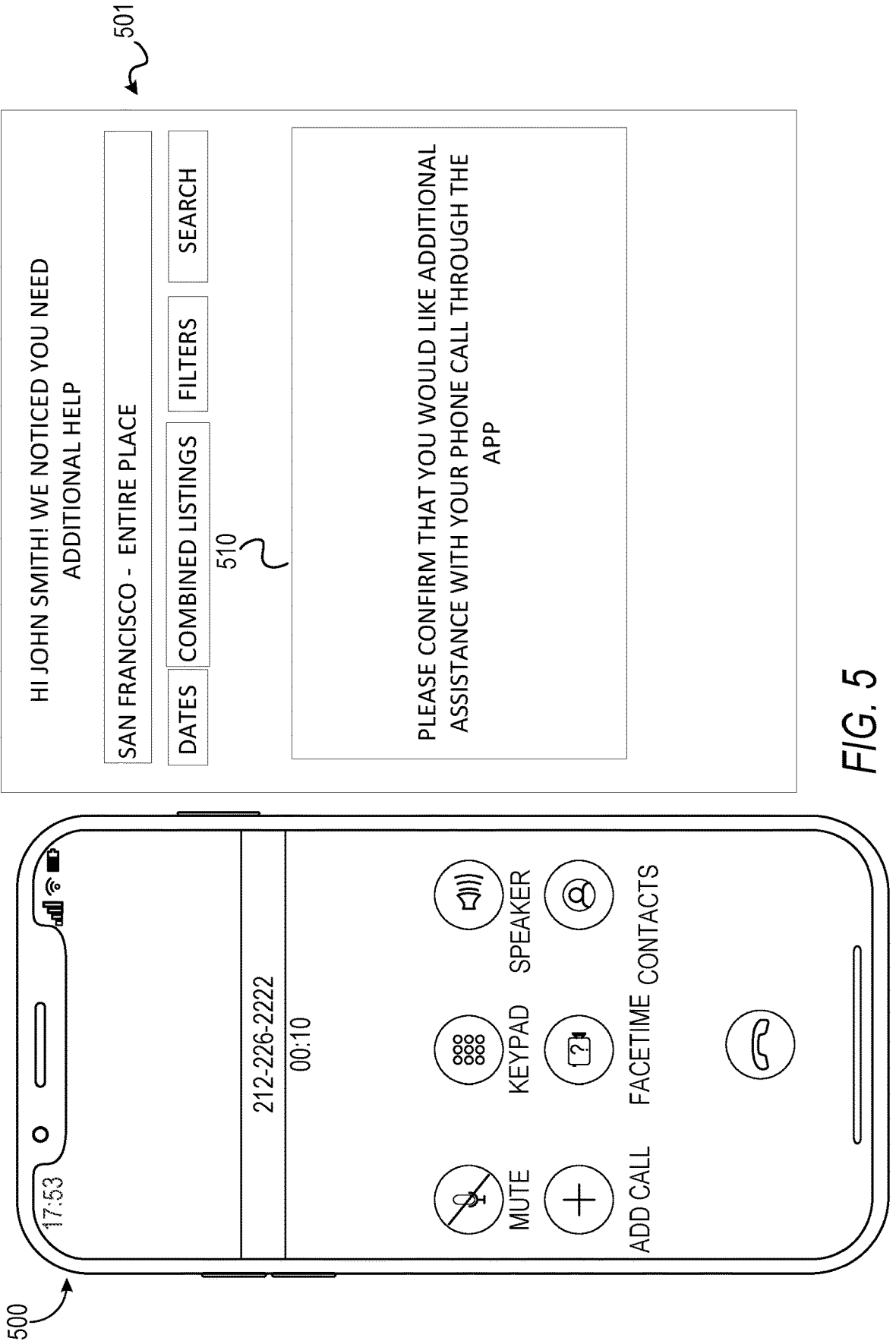

FIG. 5 shows diagrams representing inputs and outputs of the user interface synchronization system 150, according to some examples. For example, the user 210 can initiate an interaction with the user interface synchronization system 150 through a phone call. Namely, the user 210 can use the client device 110 to place a phone call to the user interface synchronization system 150, as shown in diagram 500. During the phone call, the user interface synchronization system 150 establishes a session identifier for the phone call and can ask the user 210 if the user 210 would like to continue and/or to synchronize voice input received through the first user interaction channel 220 on the phone call with user interactions performed on the programmatic client 116. If the user 210 verbally confirms the desire to synchronize the inputs, the user interface synchronization system 150 instructs, via the second user interaction channel 230, the programmatic client 116 to present a notification confirming the request to synchronize the inputs.

For example, the user interface synchronization system 150 can instruct the programmatic client 116 to navigate the user interface 300 to a new user interface 501 in which a notification 510 is presented. The notification 510 can request that the user 210 provide inputs that are transmitted to the user interface synchronization system 150 via the second user interaction channel 230 confirming the request to provide additional assistance to the phone call through the programmatic client 116. In response to the user interface synchronization system 150 receiving data from the programmatic client 116 via the second user interaction channel 230 confirming the request (e.g., if the user taps a yes option or touches a portion of the screen in which the notification 510 is presented), the user interface synchronization system 150 associates the programmatic client 116 with the same session identifier as the session identifier established in response to the user 210 placing the phone call through the first user interaction channel 220.

Figure 6:
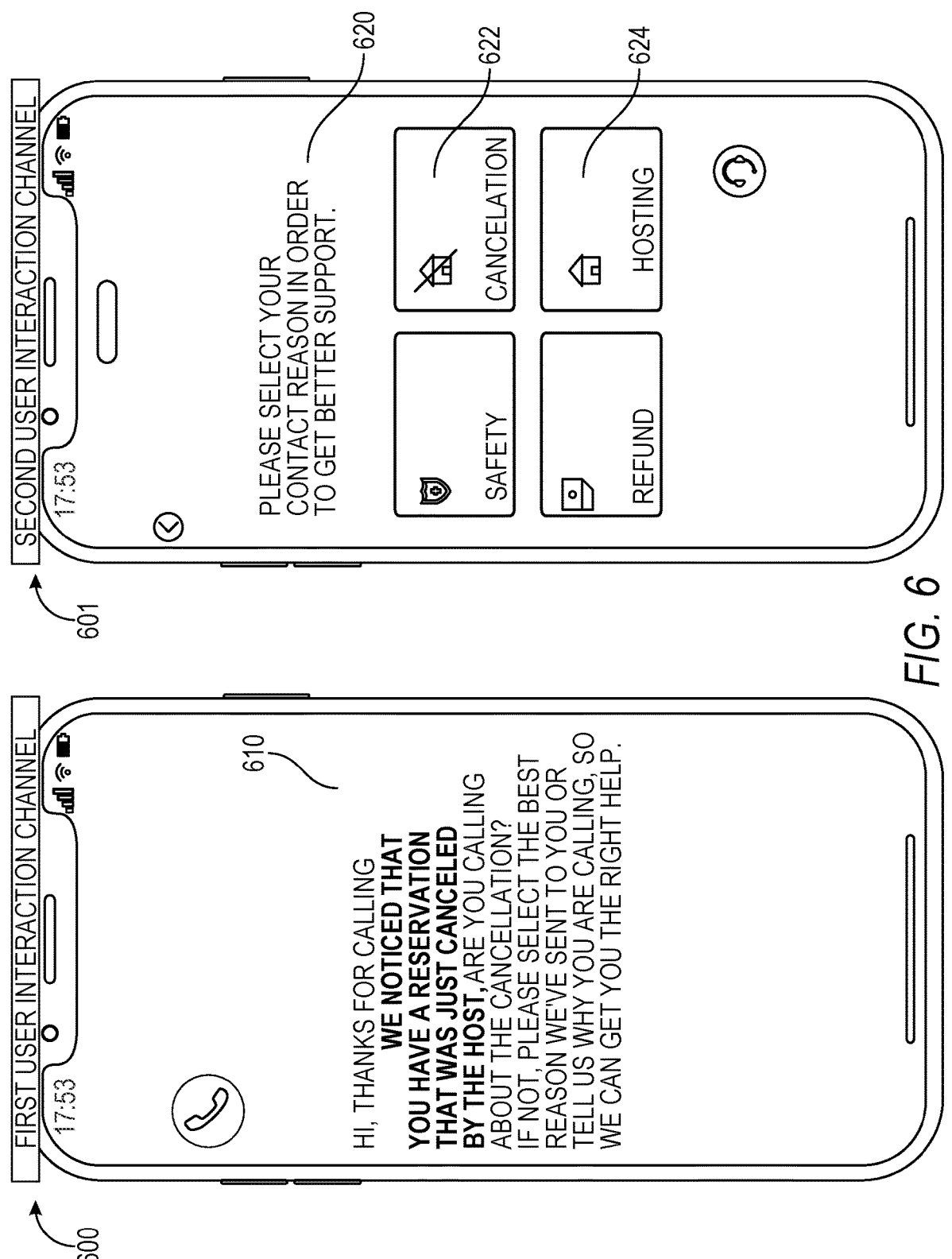

FIG. 6 shows diagrams representing inputs and outputs of the user interface synchronization system 150, according to some examples. For example, a user can initiate a phone call and receive audio prompts from the user interface synchronization system 150 through the first user interaction channel 220. The audio prompt 610 presented on the speakers 600 of the client device 110 received through the first user interaction channel 220 can indicate to the user that a recent reservation has been identified as associated with the account and the status of the reservation (e.g., the reservation status can be canceled). The audio prompt 610 can ask the user if this is the reason for the call. Simultaneously with presenting the audio prompt 610, the user interface synchronization system 150 can instruct the client device 110 or another client device to navigate programmatic client 116 to a user interface 620 by transmitting a command through the second user interaction channel 230.

The disclosed techniques and synchronization system 150 is discussed with respect to searching for reservations, similar techniques can be applied to other actions. For example, the synchronization system 150 can allow a user to use the two user interaction channels to check the refund status of a canceled reservation (e.g., the refund status can change over time from pending, accepted, to refunded. As another example, the synchronization system 150 can be used to change a reservation, such as a guest request change to the reservation date, waiting for a host to accept or decline the change, mutual cancelation, status check, and so forth.

Figure 7:

The user interface 620 can present various options of different actions that can be performed on the user interface synchronization system 150. For example, the actions can include a first option 622 for canceling a reservation and a second option 624 for hosting a reservation. The user interface 620 can supplement the audio prompt 610 by providing additional reasons for the user having placed the call to the listing network platform 142. In some examples, the user interface synchronization system 150 can detect selection of the first option 622. In response, the user interface synchronization system 150 can instruct the user interface 620 via the second user interaction channel 230 to navigate to a user interface 701, shown in FIG. 7.

The user interface 701 can present various reservations that have been canceled and/or pending reservations that can be canceled. In some cases, the user interface 701 is presented in response to receiving a verbal command via the first user interaction channel 220 asking for listings having certain parameters. The user interface synchronization system 150 can search for listings matching the attributes and present the listings on the GUI as the individual listing 710. The user interface synchronization system 150 can determine whether any listing in the GUI is selected either verbally through the first user interaction channel 220 and/or by interaction with the GUI indicated by data received through the second user interaction channel 230. If a speci-fied amount of time or threshold amount of time elapses where inputs from the first user interaction channel 220 and/or second user interaction channel 230 are not present or received (e.g., lack of input is determined), the user interface synchronization system 150 can automatically update the listings presented in the user interface 701 with other recommended listings. In some cases, rather than updating the listings, the user interface synchronization system 150 can present a prompt on the user interface 701 asking the user if the user would like additional time and/or present an audible prompt on the client device 110 through the first user interaction channel 220 asking if the user would like more time. If the user requests additional time either through the GUI or by speaking such a command and having that command communicated via the first user interaction chan-nel 220 to the user interface synchronization system 150, the user interface synchronization system 150 extends the speci-fied threshold amount of time by a specified amount. The user interface synchronization system 150 again monitors for input during the extended threshold amount of time.

In some examples, the user interface 701 can receive input that selects an individual listing 710 corresponding to a canceled reservation. This input is communicated through the client device 110 via the second user interaction channel 230 to the user interface synchronization system 150. Also, in response to receiving the input that selects the individual listing 710, the user interface synchronization system 150 navigates the user interface to another user interface in which various listings 730 are presented that correspond to available reservations. The various listings 730 can repre-sent reservations that are similar to the reservation associ-ated with the individual listing 710 and that the user can select to reserve in place of the canceled reservation asso-ciated with the individual listing 710.

While the user is viewing the various listings 730 on the client device 110, the user can speak a verbal command 720. The verbal command 720 can be "I want to rebook this one." This verbal command 720 is communicated back to the user interface synchronization system 150 via the first user interaction channel 220 through an established phone call 700. The user interface synchronization system 150 can convert the verbal command 720 to text and can determine that the text includes ambiguous input or a pronoun, such as "this one." In order to interpret the ambiguous input or pronoun, the user interface synchronization system 150 can analyze the various listings 730 presented on the client device 110. The user interface synchronization system 150 can identify a particular listing of the various listings 730 that is presented most prominently (e.g., the graphical ele-ment of the particular listing is occupying a larger amount of screen space than other graphical elements of the various listings 730 and/or is in a specified position, such as the center or top of the screen). The user interface synchroni-zation system 150 can then predict that the ambiguous input or pronoun refers to the particular listing that is presented most prominently on the client device 110.

Figure 8:
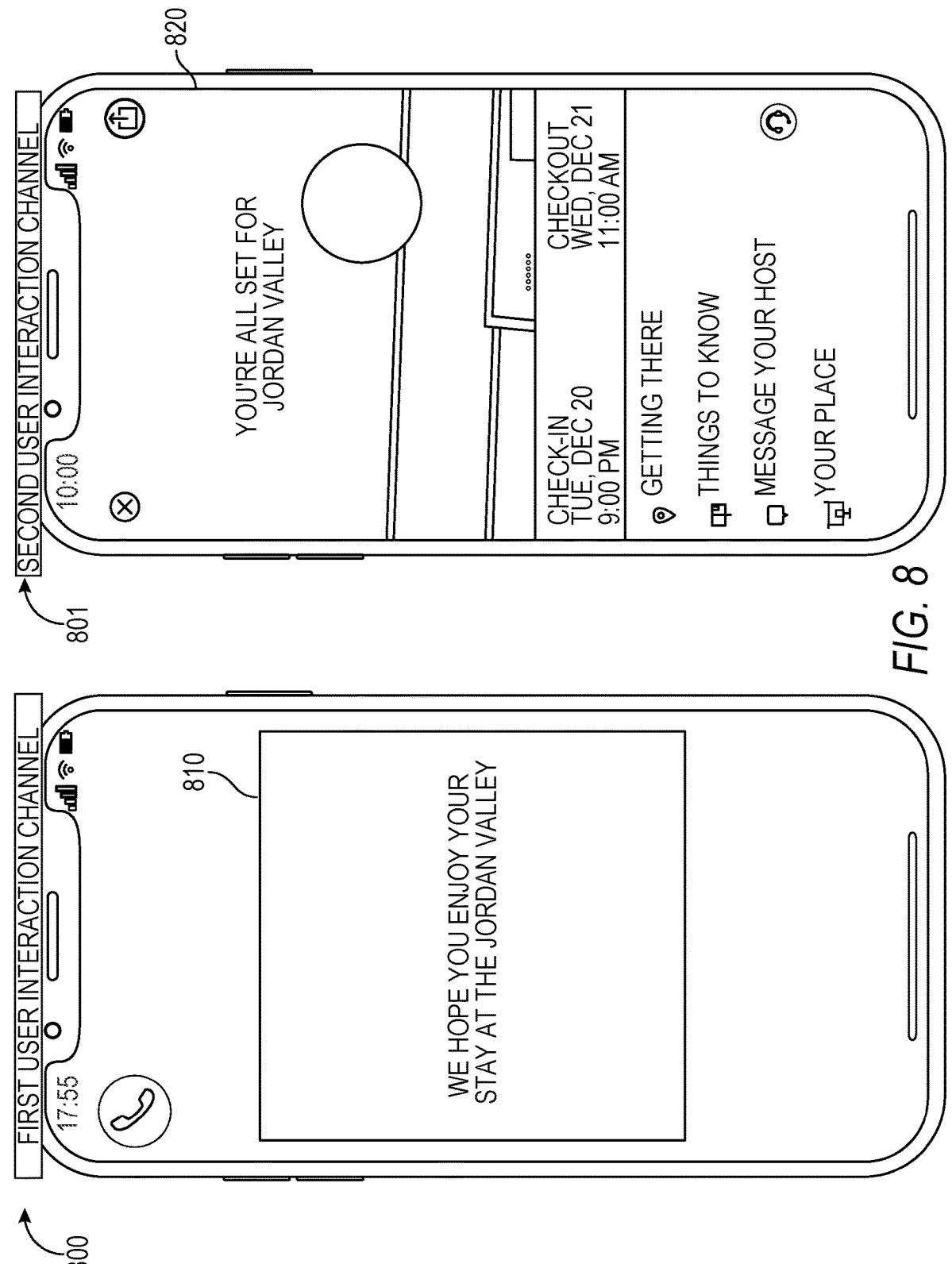

In response to determining that the verbal command received through the first user interaction channel 220 refers to the particular listing presented on the GUI of the client device 110 in a particular manner, the user interface syn-chronization system 150 transmits a communication back to the client device 110 via the second user interaction channel 230 to navigate to a user interface 801, shown in FIG. 8. The user interface 801 provides confirmation 820 about the reservation associated with the particular listing including details about when check in and check out are and indicates that the reservation has been scheduled. The user interface 801 can include various other options, such as messaging a host of the reservation or receiving directions to the physical location of the reservation. Concurrently with presenting the user interface 801, the user interface synchronization system 150 transmits an audio prompt 810 for presentation on the client device 110 on which a phone call 800 is taking place. The audio prompt 810 can identify the reservation associ-ated with the confirmation 820 and can inform the user to enjoy their stay.

FIG. 9 shows a flow diagram of various processes and methods for synchronizing user interactions with the listing network site across various user interaction channels, according to some example embodiments.

At operation 905, the user interface synchronization sys-tem 150 receives, by a network site via a first user interaction channel (e.g., first user interaction channel 220), a user request to perform an action with a listing network platform, as discussed above.

At operation 910, the user interface synchronization sys-tem 150 establishes, by the network site, a session associated with a session identifier for the user request, as discussed above.

At operation 915, the user interface synchronization sys-tem 150 provides an option for the user to continue inter-acting with the listing network platform through a second user interaction channel (e.g., second user interaction chan-nel 230), as discussed above.

At operation 920, the user interface synchronization sys-tem 150, in response to receiving input that selects the option, uses the session identifier associated with the session to synchronize a first set of inputs received through the first user interaction channel with a second set of inputs received through the second user interaction channel to complete the action on the listing network platform, as discussed above.

In some examples, the first user interaction channel is associated with a first user interface and the second user interaction channel is associated with a second user inter-face. The user interface synchronization system 150 con-tinuously monitors the first user interaction channel and the second user interaction channel for inputs to complete the action. In some examples, the first user interaction channel is a voice-only-based channel associated with an interactive voice response system and the second user interaction channel is associated with a GUI presented on an application implemented on a client device 110. In some examples, the second user interaction channel is a voice-only-based chan-nel associated with an interactive voice response system and the first user interaction channel is associated with a GUI presented on an application implemented on a client device 110.

In some examples, the user interface synchronization system 150 causes display, on a client device 110 of the user, of the option on a graphical user interface. The user interface synchronization system 150 detects, via the graphical user interface, selection of the option and initiates, by the user interface synchronization system 150, a phone call to the client device 110 of the user in response to detecting selection of the option.

In some examples, the user interface synchronization system 150 detects audio input representing selection of the option via the first user interaction channel. The user inter-face synchronization system 150 triggers a client device 110 of the user to visually present a notification through the second interaction channel, the notification indicating selec-tion of the option received via the first interaction channel. The user interface synchronization system 150 receives, via the second interaction channel, additional input selecting a confirmation option included in the notification to enable synchronizing of the first set of inputs with the second set of inputs.

In some examples, the user interface synchronization system 150 receives a phone call from the user on the network site. The user interface synchronization system 150 identifies a reservation associated with a phone number of the user on the network site and determines a reservation status of the reservation on the network site. The user interface synchronization system 150 presents audio representing the reservation status to the user via the phone call and triggers presentation on a GUI of a client device 110 of the user including one or more options associated with the user request together with presenting the audio via the phone call. In some examples, the one or more options include a first option associated with cancelation of the reservation and a second option associated with modifying the reservation.

In some examples, the user interface synchronization system 150 presents a plurality of listings including an individual listing related to the reservation on the graphical user interface. The user interface synchronization system 150 receives verbal input from the user via the phone call while the plurality of listings is being presented, the verbal input including the action. The user interface synchronization system 150 processes the verbal input based on the plurality of listings being presented to perform the action. In some examples, the user interface synchronization system 150 determines that the verbal input includes a pronoun or an ambiguous word or phrase. The user interface synchronization system 150 interprets the pronoun or ambiguous word or phrase received in the verbal input via the phone call based on an analysis of the plurality of listings being presented on the GUI of the client device 110.

In some examples, the user interface synchronization system 150 accesses a plurality of messages exchanged between the user and a host of the reservation. The user interface synchronization system 150 determines the reservation status or reason for the phone call based on the plurality of messages. In some cases, the user interface synchronization system 150 interprets the pronoun or ambiguous word or phrase received in the verbal input via the phone call based on an analysis of the plurality of messages exchanged between the user and a host of the reservation.

In some examples, the user interface synchronization system 150 detects selection of an individual option from the one or more options presented on the graphical user interface of the client device. The user interface synchronization system 150 generates an audio response representing the selection of the individual option via the phone call. In some examples, the user interface synchronization system 150 stores a state machine associated with the session on the network site. The user interface synchronization system 150 advances the state machine to a first state in response to receiving the first set of inputs through the first user interaction channel and generates a first output via the second user interaction channel in response to advancing the state machine to the first state. In some examples, the user interface synchronization system 150 advances the state machine to a second state in response to receiving the second set of inputs through the second user interaction channel and generates a second output via the first user interaction channel in response to advancing the state machine to the second state.

In some examples, the first set of inputs includes a search query, the first output includes listings corresponding to the search query, the second set of inputs includes a selection of a listing from the listings of the first output, and the second output includes the action to perform in relation to a reservation associated with the listing. In some examples, the user interface synchronization system 150 detects, as the first set of inputs received through the first user interaction channel, lack of user interaction for a threshold period of time. In response to detecting the lack of user interaction for the threshold period of time, the user interface synchronization system 150 generates an output on the second user interaction channel. In some examples, the output includes a recommendation associated with the action. In some examples, the output includes a prompt asking the user to confirm extension of the threshold period of time.

Figure 10:
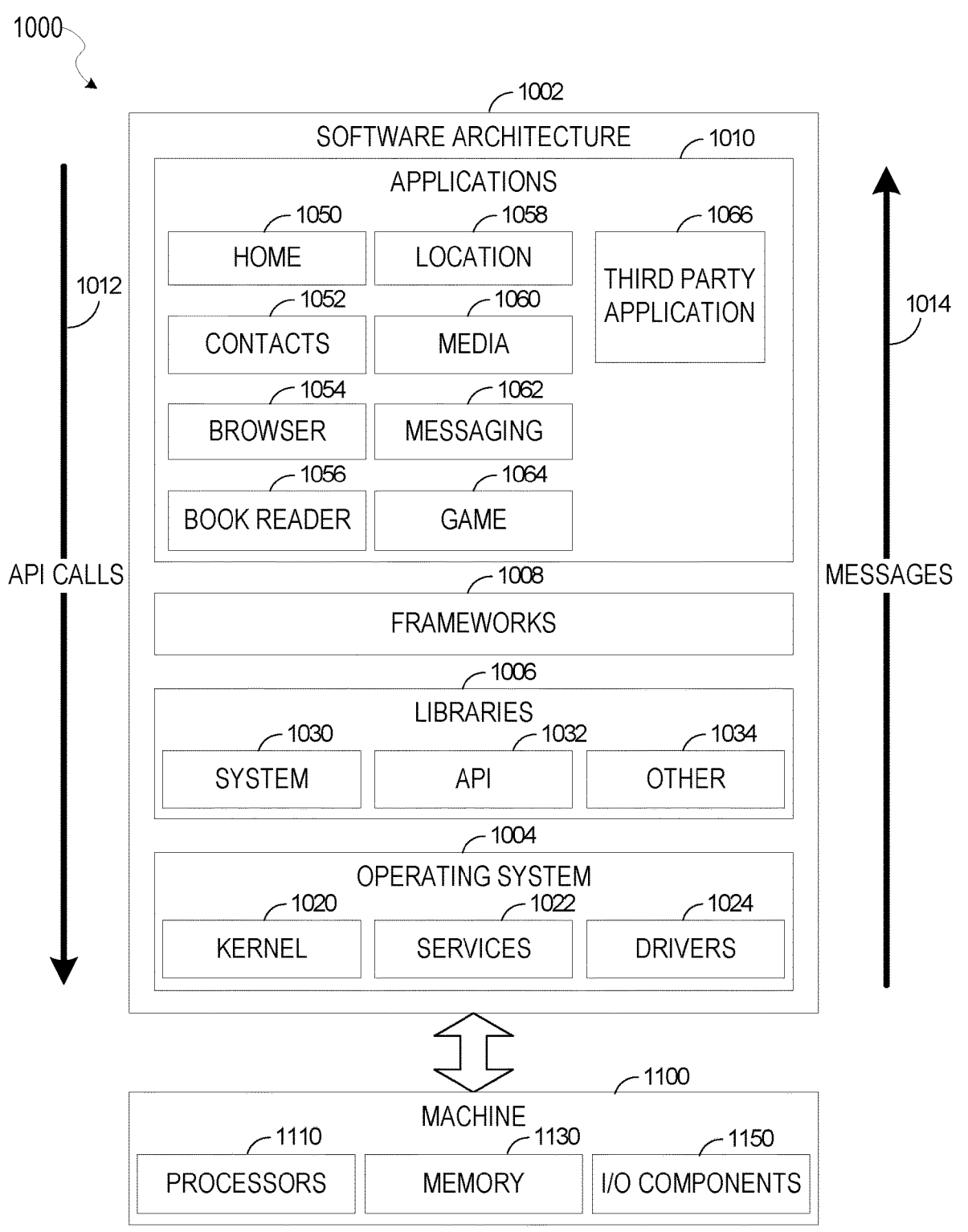
FIG. 10 is a block diagram illustrating the architecture of software used to implement the disclosed system, according to some examples.

FIG. 10 is a block diagram 1000 illustrating an architecture of software 1002, which can be installed on any one or more of the devices described above. FIG. 10 is merely a non-limiting example of a software architecture, and it will be appreciated that many other architectures can be implemented to facilitate the functionality described herein. In various embodiments, the software 1002 is implemented by hardware such as a machine 1100 of FIG. 11 that includes processors 1110, memory 1130, and input/output (I/O) components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, Kotlin, Ruby, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate the functionality described herein.

Figure 11:
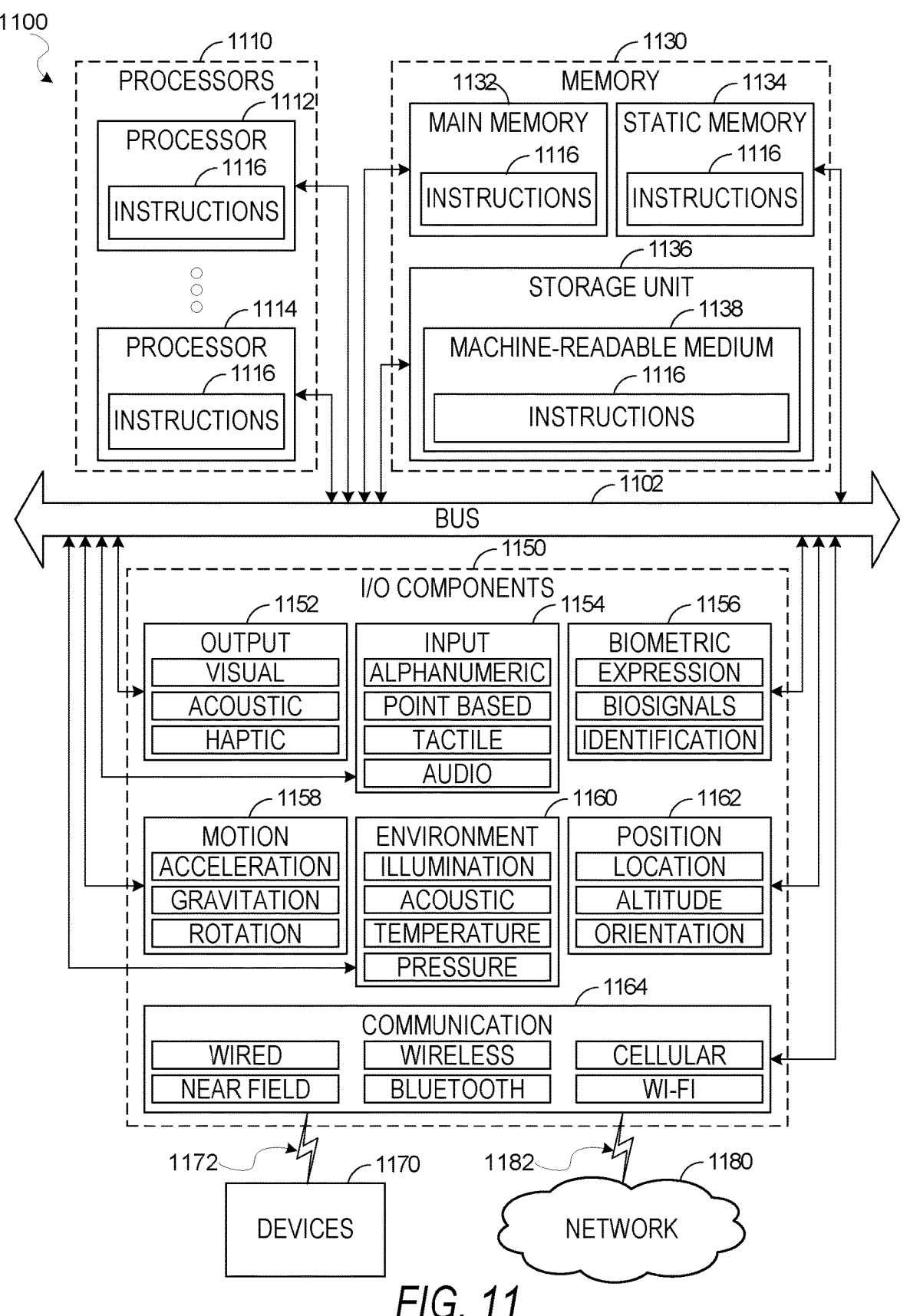
FIG. 11 shows a machine as an example computer system with instructions to cause the machine to implement the disclosed system, according to some examples.

FIG. 11 illustrates a diagrammatic representation of a machine 1100 in the form of a computer system within which a set of instructions may be executed for causing the machine to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, an STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 may include a main memory 1132, a static memory 1134, and a storage unit 1136, all accessible to the processors 1110 such as via the bus 1102. The main memory 1132, the static memory 1134, and storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or storage unit 1136 may store one or more sets of instructions and data structures (e.g., software) embodying or utilized by any one or more of the methodologies or functions described herein. These instructions (e.g., the instructions 1116), when executed by processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a VPN, an LAN, a WLAN, a WAN, a WWAN, an MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

What is claimed is:

1. A method comprising:
receiving, by a network site via a first user interaction channel, a user request to perform an action with a listing network platform;
establishing, by the network site, a session associated with a session identifier for the user request;
providing an option for a user to continue interacting with the listing network platform through a second user interaction channel;
in response to receiving input that selects the option, using the session identifier associated with the session to synchronize a first set of inputs received through the first user interaction channel with a second set of inputs received through the second user interaction channel to complete the action on the listing network platform;
accessing a plurality of messages exchanged between a user of the first user interaction channel and a host of a reservation associated with the user; and
determining a reservation status or reason for establishing the second user interaction channel based on the plurality of messages.

2. The method of claim 1, wherein the first user interaction channel is associated with a first user interface, and wherein the second user interaction channel is associated with a second user interface, further comprising continuously monitoring the first user interaction channel and the second user interaction channel for inputs to complete the action.

3. The method of claim 2, wherein the first user interaction channel is a voice-only-based channel associated with an interactive voice response system, and wherein the second user interaction channel is associated with a graphical user interface presented on an application implemented on a client device.

4. The method of claim 2, wherein the second user interaction channel is a voice-only-based channel associated with an interactive voice response system, and wherein the first user interaction channel is associated with a graphical user interface presented on an application implemented on a client device.

5. The method of claim 1, further comprising:
causing display, on a client device of the user, of the option on a graphical user interface;
detecting, via the graphical user interface, selection of the option; and
initiating, by the network site, a phone call to the client device of the user in response to detecting selection of the option.

6. The method of claim 1, further comprising:
detecting audio input representing selection of the option via the first user interaction channel;
triggering, by the network site, a client device of the user to visually present a notification through the second user interaction channel, the notification indicating selection of the option received via the first user interaction channel; and
receiving, via the second user interaction channel, additional input selecting a confirmation option included in the notification to enable synchronizing of the first set of inputs with the second set of inputs.

7. The method of claim 1, further comprising:
receiving a phone call from the user on the network site;
identifying the reservation associated with a phone number of the user on the network site;
determining a reservation status of the reservation on the network site;
presenting audio representing the reservation status to the user via the phone call; and
triggering a presentation on a graphical user interface of a client device of the user comprising one or more options associated with the user request together with presenting the audio via the phone call.

8. The method of claim 7, wherein the one or more options include a first option associated with cancelling the reservation and a second option associated with modifying the reservation.

9. The method of claim 7, further comprising:
presenting a plurality of listings including an individual listing related to the reservation on the graphical user interface;
receiving verbal input from the user via the phone call while the plurality of listings is being presented, the verbal input comprising the action; and
processing the verbal input based on the plurality of listings being presented to perform the action.

10. The method of claim 9, further comprising:
determining that the verbal input comprises a pronoun; and
interpreting the pronoun received in the verbal input via the phone call based on an analysis of the plurality of listings being presented on the graphical user interface.

11. The method of claim 7, further comprising:

detecting selection of an individual option from the one or more options presented on the graphical user interface of the client device; and generating an audio response representing the selection of the individual option via the phone call.

12. The method of claim 1, further comprising:

storing a state machine associated with the session on the network site;

advancing the state machine to a first state in response to receiving the first set of inputs through the first user interaction channel; and generating a first output via the second user interaction channel in response to advancing the state machine to the first state.

13. The method of claim 12, further comprising:

advancing the state machine to a second state in response to receiving the second set of inputs through the second user interaction channel; and generating a second output via the first user interaction channel in response to advancing the state machine to the second state.

14. The method of claim 1, comprising:

in response to detecting a lack of user interaction for a threshold period of time, generating an output on the second user interaction channel, the output comprises a prompt asking the user to confirm extension of the threshold period of time.

15. The method of claim 1, further comprising:

detecting, as the first set of inputs received through the first user interaction channel, lack of user interaction for a threshold period of time; and in response to detecting the lack of user interaction for the threshold period of time, generating an output on the second user interaction channel.

16. The method of claim 15, wherein the output comprises a recommendation associated with the action.

17. The method of claim 15, wherein the output comprises a prompt asking the user to confirm extension of the threshold period of time.

18. The method of claim 1, further comprising:

presenting a plurality of listings including an individual listing related to the reservation on a graphical user interface of a client device;

receiving verbal input from the user via a phone call while the plurality of listings is being presented, the verbal input comprising the action; and processing the verbal input based on the plurality of listings being presented to perform the action.

19. A system comprising:

one or more processors of a machine; and a memory storing instruction that, when executed by the one or more processors, cause the machine to perform operations comprising:

receiving, by a network site via a first user interaction channel, a user request to perform an action with a listing network platform;

establishing, by the network site, a session associated with a session identifier for the user request;

providing an option for a user to continue interacting with the listing network platform through a second user interaction channel;

in response to receiving input that selects the option, using the session identifier associated with the session to synchronize a first set of inputs received through the first user interaction channel with a second set of inputs received through the second user interaction channel to complete the action on the listing network platform;

accessing a plurality of messages exchanged between a user of the first user interaction channel and a host of a reservation associated with the user; and determining a reservation status or reason for establishing the second user interaction channel based on the plurality of messages.

20. A non-transitory machine-readable storage device embodying instructions that, when executed by a machine, cause the machine to perform operations comprising:

receiving, by a network site via a first user interaction channel, a user request to perform an action with a listing network platform;

establishing, by the network site, a session associated with a session identifier for the user request;

providing an option for a user to continue interacting with the listing network platform through a second user interaction channel;

in response to receiving input that selects the option, using the session identifier associated with the session to synchronize a first set of inputs received through the first user interaction channel with a second set of inputs received through the second user interaction channel to complete the action on the listing network platform;

accessing a plurality of messages exchanged between a user of the first user interaction channel and a host of a reservation associated with the user; and determining a reservation status or reason for establishing the second user interaction channel based on the plurality of messages.

*    *    *    *    *